United States Patent [19]
Smith

[11] 3,735,643
[45] May 29, 1973

[54] SPECIFIC VARIABLE RATIO ACTUATOR

[76] Inventor: Wille M. Smith, 3716 S.W. 14th Street, Fort Lauderdale, Fla. 33312

[22] Filed: Sept. 13, 1971
[21] Appl. No.: 179,977

[52] U.S. Cl. ................................................. 74/89.16
[51] Int. Cl. .............................................. F16h 27/02
[58] Field of Search ................ 74/89.16, 421, 803, 74/484, 492, 388

[56] References Cited
UNITED STATES PATENTS

| | | | |
|---|---|---|---|
| 890,107 | 6/1908 | Decar | 74/803 |
| 1,499,432 | 7/1924 | Williston et al. | 74/492 |
| 2,329,604 | 9/1943 | Ginter | 74/803 |
| 2,667,135 | 1/1954 | Bell | 74/803 |
| 3,186,729 | 6/1965 | Vacante | 74/492 |

Primary Examiner—Charles J. Myhre
Assistant Examiner—Wesley S. Ratliff, Jr.

[57] ABSTRACT

A variable ratio device for producing specific non-linear motion. This device includes primarily, an internally toothed housing in which is rotatable, by shaft means, a pair of gears supported upon pillow blocks, the pillow blocks having a gear with an offset pin, the offset pin carrying a rod which extends from out of the housing.

2 Claims, 2 Drawing Figures

PATENTED MAY 29 1973

3,735,643

INVENTOR.
WILLIE M. SMITH

SPECIFIC VARIABLE RATIO ACTUATOR

This invention relates to mechanical mechanisms, and more particularly to a specific non-linear motion, variable ratio actuator.

It is therefore the primary purpose of this invention to provide a variable ration actuator which will be used primarily for steering mechanisms for vehicles, and may also be used for the control circuitry and other non-linear devices.

Another object of this invention is to provide a variable ratio actuator which will have a housing having a plurality of teeth on its inner surface, the teeth serving to engage with a pair of spaced apart gears, the gears being supported by pillow blocks on the drive shaft.

Another object of this invention is to provide a variable ratio actuator of the type described which will have offset pin means carrying the actuating rod, the gear arrangement being oscillatable in an arcuate manner on the interior of the housing of the device to thus impart non-linear motion to the rod.

A further object of this invention is to provide a device of the type described of which the drive shaft will be rotatable freely so as to carry the pillow blocks which serve as arm means for the gears, the shaft being rotatable by a crank member externally of the housing of the device.

Other objects of the invention are to provide a specific variable ratio actuator which is simple in design, inexpensive to manufacture, rugged in construction, easy to use and efficient in operation.

Figure 1:
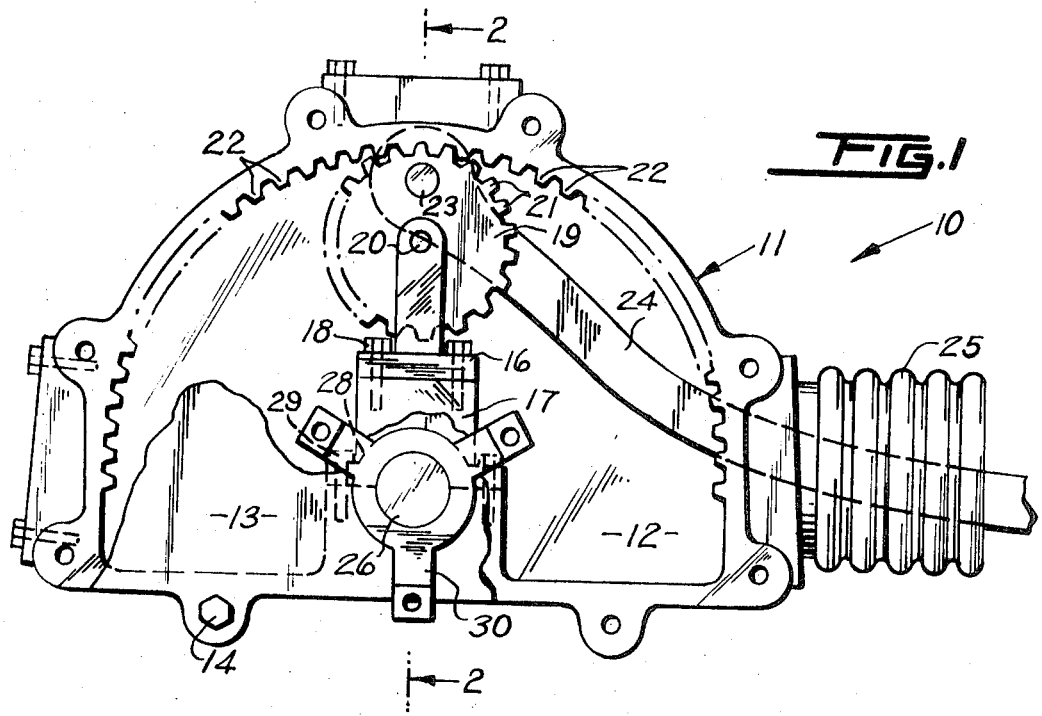
Figure 2:
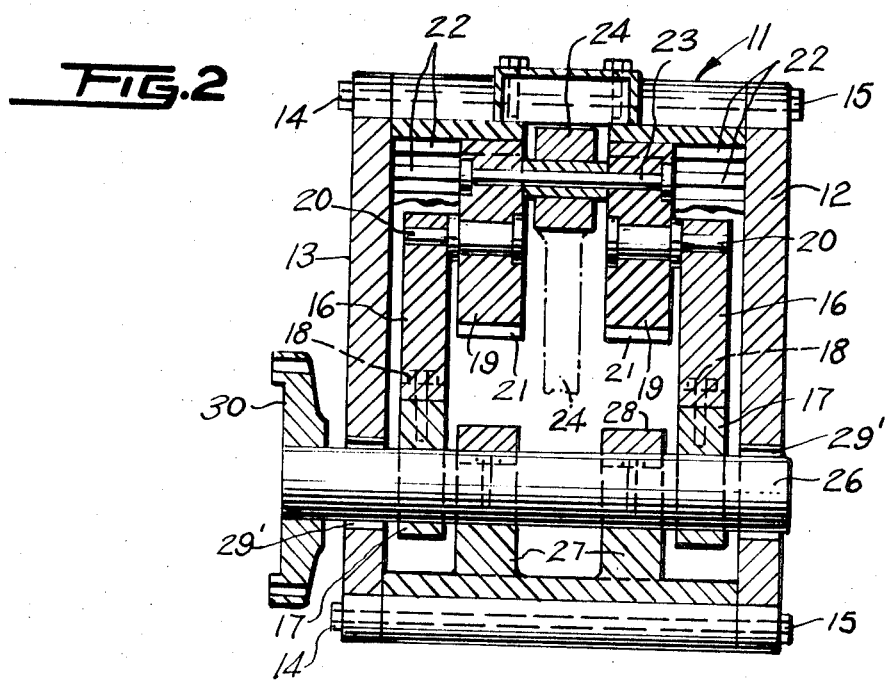

These and other objects will be readily evident upon a study of the following specification and the accompanying drawing, wherein:

FIG. 1 is a side view of the present invention shown partly broken away and in elevation; and FIG. 2 is a cross sectional view taken along the line 2—2 of FIG. 1.

According to this invention, a specific variable ratio actuator 10 is shown to include a semicurcular configurated housing 11 made of a suitable metal, having a cover plate 12 and 13, one secured each to the sides of the housing 11 by means of bolt 14 and nut 15 fasteners. Carried within the housing 11 are a pair of spaced apart pillow blocks 16 which serve as arm members and are secured to the journals 17 by means of bolt fasteners 18. A pair of spaced apart gears 19 are freely rotatable upon shafts 20 carried by pillow blocks 16. The teeth 21 of gears 19 are in engagement with the teeth 22 within the housing 11 and an offset pin 23 is carried by gears 19 and freely and rotatably carries the actuator rod 24 which imparts a non-linear motion to a given mechanism (not shown). Rod 24 is movable externally of housing 11, through the attached sleeve 25.

A shaft 26 is supported within fixed journals 27 of housing 11 and is capped by means of caps 28 which are held secure by means of bolts 29. Shaft 26 is freely and rotatably carried within openings 29' of the cover plates 12 and 13 and a crank member 30 is secured fixedly in a well known manner to the exposed end of shaft 26 externally of housing 11. When shaft 26 is rotated, the pillow block arms 16 will pivot gears 19 which will rotate by being in engagement with the teeth 22 of housing 11 and thus motion is imparted to the rod 24.

What is claimed is:

1. A specific variable ratio actuator for steering applications, control circuitry and the like, comprising a semi-circular housing having a cover plate at each end, bolt fasteners carried by said housing for securing said plates thereto, a pair of rotatable and pivotable gears carried within said housing for imparting motion in an oscillatable manner to the actuating rod of said device, pillow block arm means carried within said housing for supporting said gear in engagement with the teeth on the inner surface of said housing, shaft means rotatable within said housing for imparting an arcuate motion to said pillow block arm supporting said gears, a crank member carried by said device for the rotation of said shaft of said device, said gears of said housing of said device being spaced apart and carrying between them said actuating rod, said rod being free to rotate upon pin means carried by both said gears, said pin means being offset of the central axis of said gears and said gear being rotated by said shaft of said housing while said pillow block arms are simultaneously moved in an arcuate and oscillatable fashion, said pillow block arms supporting said gears of said device being secured by bolt fasteners to journal members which are secured fast to said crank which rotates said pillow block arms in an arcuate manner, and shaft being free to rotate within openings of said cover plates of said housing, one on either side, said shaft which provides rotation for said pillow block arms being rotatable by said crank member, said crank member being external of one side of housing and said crank member being provided with openings and arm portions for receiving suitable drive members and said shaft being in parallel alignment with said shaft supporting said gears and said offset shaft supporting said rod and space means within the inner peripheral arc surface of said housing providing freedom of travel of the hub of said actuator rod, said actuator rod extending out of said housing through sleeve means secured to one side of said housing.

2. The combination according to claim 1, wherein said mechanism on the interior of said housing includes said pillow block arms which are removable by removing said bolts therefrom, for the insertion of shims to compensate for wear that occurs through constant use of said device.

* * * * *